(12) United States Patent
Park

(10) Patent No.: US 12,362,860 B2
(45) Date of Patent: Jul. 15, 2025

(54) METHOD AND DEVICE FOR TRANSMITTING/RECEIVING SIGNAL IN HALF-DUPLEX SCHEME

(71) Applicant: KT CORPORATION, Gyeonggi-do (KR)

(72) Inventor: Ki-Hyeon Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 321 days.

(21) Appl. No.: 17/703,416

(22) Filed: Mar. 24, 2022

(65) Prior Publication Data

US 2022/0311546 A1  Sep. 29, 2022

(30) Foreign Application Priority Data

Mar. 26, 2021 (KR) .................. 10-2021-0039713
Mar. 15, 2022 (KR) .................. 10-2022-0032195

(51) Int. Cl.
*H04L 1/08* (2006.01)
*H04L 5/16* (2006.01)
(Continued)

(52) U.S. Cl.
CPC .............. *H04L 1/08* (2013.01); *H04L 5/16* (2013.01); *H04W 72/0446* (2013.01); *H04W 72/1263* (2013.01); *H04W 76/19* (2018.02)

(58) Field of Classification Search
CPC ... H04L 1/08; H04L 5/16; H04L 1/189; H04L 1/1893; H04L 1/00; H04L 5/0007; H04L 5/001; H04L 5/0044; H04L 5/0053; H04L 5/0094; H04L 1/1867; H04L 5/00; H04L 5/24; H04L 5/14; H04L 1/1858; H04L 5/18; H04L 72/0453; H04L 5/0003; H04W 72/0446; H04W 76/19; H04W 72/1263; H04W 72/0453; H04W 52/143;
(Continued)

(56) References Cited

U.S. PATENT DOCUMENTS

| 5,574,934 A | * | 11/1996 | Mirashrafi et al. | ........... | 395/800 |
| 2012/0076057 A1 | * | 3/2012 | Pannell et al. | ................ | 370/296 |

(Continued)

FOREIGN PATENT DOCUMENTS

| CN | 108650066 B | * | 4/2021 |
| CN | 114503660 A | * | 5/2022 |

(Continued)

OTHER PUBLICATIONS

European Patent Office, European Search Report of corresponding EP Patent Application No. 22164524.5, Jul. 21, 2022.

*Primary Examiner* — Meless N Zewdu
(74) *Attorney, Agent, or Firm* — IP Legal Services, LLC

(57) ABSTRACT

Provided are a method and device for transmitting/receiving data in a half-duplex scheme. The method may include performing, as a first operation, one of signal transmission through an uplink and signal reception through a downlink in an FDD channel environment, receiving information indicating, as a second operation, the other of the signal transmission through the uplink and the signal reception through the downlink while performing the first operation, and stopping the first operation and performing the second operation according to the reception of the information.

3 Claims, 13 Drawing Sheets

(51) Int. Cl.
   *H04W 72/0446*   (2023.01)
   *H04W 72/1263*   (2023.01)
   *H04W 76/19*     (2018.01)

(58) Field of Classification Search
   CPC ........... H04W 52/146; H04W 72/1268; H04W 72/1273; H04W 72/21; H04W 72/23; H04W 74/00; H04W 74/002; H04W 74/004; H04W 74/006; H04W 76/20; H04W 76/18; H04W 72/12; H04W 72/04
   See application file for complete search history.

(56) References Cited

U.S. PATENT DOCUMENTS

| | | | |
|---|---|---|---|
| 2016/0127918 A1* | 5/2016 | Yi et al. | H04W 16/26 |
| 2018/0007667 A1 | 1/2018 | You et al. | |
| 2019/0182715 A1 | 6/2019 | Urabayashi et al. | |
| 2020/0021999 A1* | 1/2020 | Park et al. | H04W 16/14 |
| 2021/0067308 A1* | 3/2021 | Ly et al. | H04L 5/16 |
| 2022/0361231 A1* | 11/2022 | Oh et al. | H04W 72/14 |

FOREIGN PATENT DOCUMENTS

| | | | | |
|---|---|---|---|---|
| CN | 116963281 A | * | 10/2023 | |
| JP | 7128650 B2 | * | 8/2022 | |
| WO | WO 2016/164739 A1 | * | 10/2016 | H04L 1/00 |
| WO | 2021/012247 A1 | | 1/2021 | |

\* cited by examiner

METHOD AND DEVICE FOR TRANSMITTING/RECEIVING SIGNAL IN HALF-DUPLEX SCHEME

CROSS-REFERENCE TO RELATED APPLICATION

This application claims priority from Korean Patent Application Nos. 10-2021-0039713, filed on Mar. 26, 2021, and 10-2022-0032195, filed on Mar. 15, 2022, which are hereby incorporated by reference for all purposes as if fully set forth herein.

BACKGROUND

Field

The present embodiments relate to methods and devices for transmitting and receiving data in a half-duplex scheme in a next-generation wireless access network (hereinafter, "new radio (NR)").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of NR. In order to meet the requirements of the individual scenarios, it is required to design NR to have flexible frame structures, compared with LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

In such an aspect, there is demand of design for a duplexing method for UEs not supporting uplink/downlink simultaneous transmission in an FDD channel environment.

BRIEF SUMMARY

According to embodiments of the disclosure, a method and device may be provided for transmitting/receiving data in a half-duplex scheme.

In an aspect, a method for transmitting/receiving a signal by a user equipment (UE) operating in half duplex (HD)-frequency division duplex (FDD), may include performing, as a first operation, one of signal transmission through an uplink and signal reception through a downlink in an FDD channel environment, receiving information indicating, as a second operation, the other of the signal transmission through the uplink and the signal reception through the downlink while performing the first operation, and stopping the first operation and performing the second operation according to the reception of the information.

In another aspect, a method for transmitting/receiving, by a base station, a signal to/from a user equipment (UE) operating in half duplex (HD)-frequency division duplex (FDD), may include performing, as a first operation, one of signal reception through an uplink and signal transmission through a downlink in an FDD channel environment, transmitting information indicating, as a second operation, the other of the signal transmission through the uplink and the signal reception through the downlink while performing the first operation, and stopping the first operation and performing the second operation according to the transmission of the information.

In still another aspect, a user equipment (UE) operating in half duplex (HD)-frequency division duplex (FDD) to transmit/receive a signal, may include a transmitter, a receiver, and a controller controlling the transmitter and the receiver, performing, as a first operation, one of signal transmission through an uplink and signal reception through a downlink in an FDD channel environment, receiving information indicating, as a second operation, the other of the signal transmission through the uplink and the signal reception through the downlink while performing the first operation, and stopping the first operation and performing the second operation according to the reception of the information.

In a yet still another aspect, a base station transmitting/receiving a signal to/from a user equipment (UE) operating in half duplex (HD)-frequency division duplex (FDD), may include a transmitter, a receiver, and a controller controlling the transmitter and the receiver, performing, as a first operation, one of signal reception through an uplink and signal transmission through a downlink in an FDD channel environment, transmitting information indicating, as a second operation, the other of the signal transmission through the uplink and the signal reception through the downlink while performing the first operation, and stopping the first operation and performing the second operation according to the transmission of the information.

According to embodiments of the disclosure, a method and device may be provided for transmitting/receiving signals in a half-duplex scheme.

DESCRIPTION OF DRAWINGS

The above and other objects, features, and advantages of the present disclosure will be more clearly understood from the following detailed description, taken in conjunction with the accompanying drawings, in which.

The above and other aspects, features, and advantages of the present disclosure will be more apparent from the following detailed description taken in conjunction with the accompanying drawings, in which.

DETAILED DESCRIPTION

Figure 1:
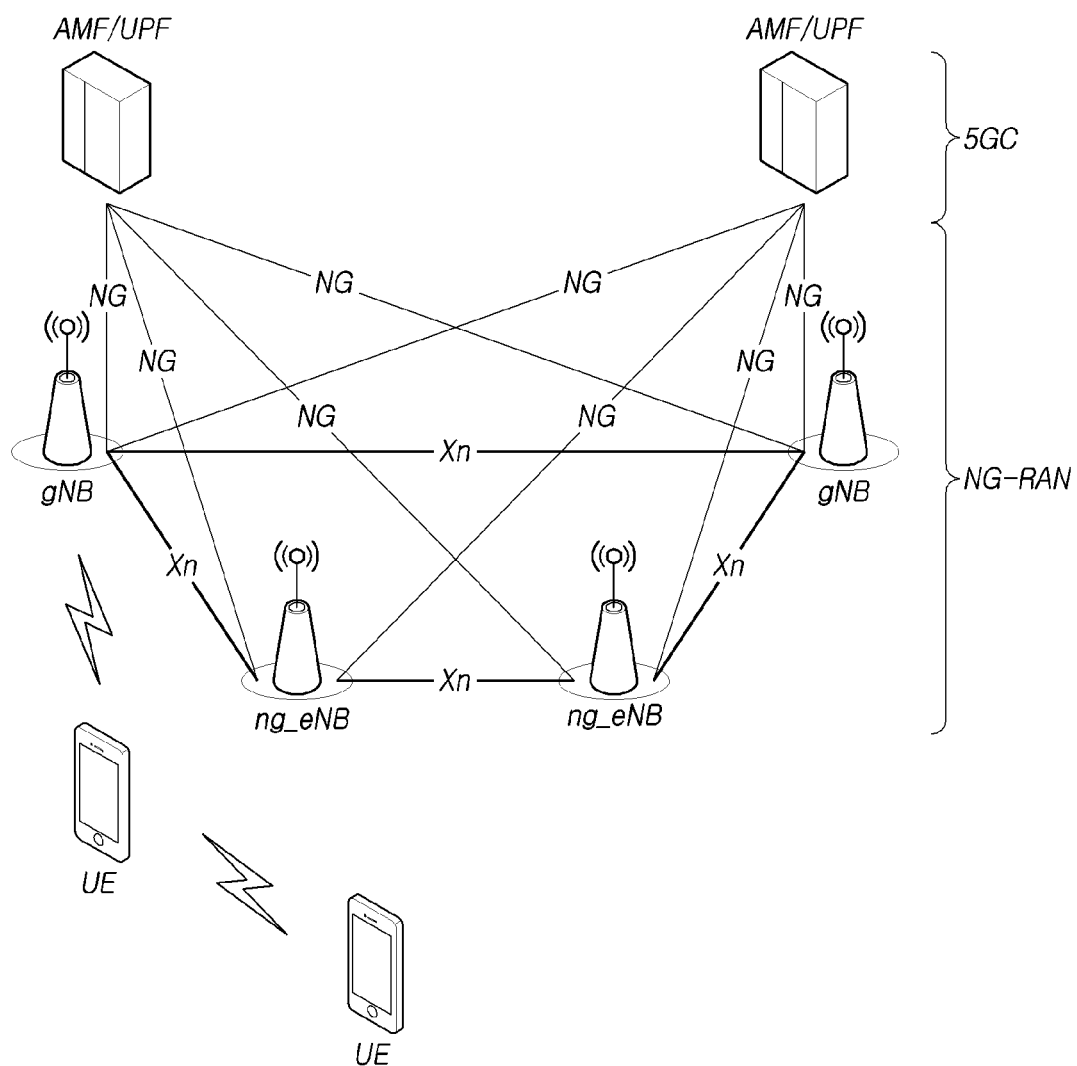
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
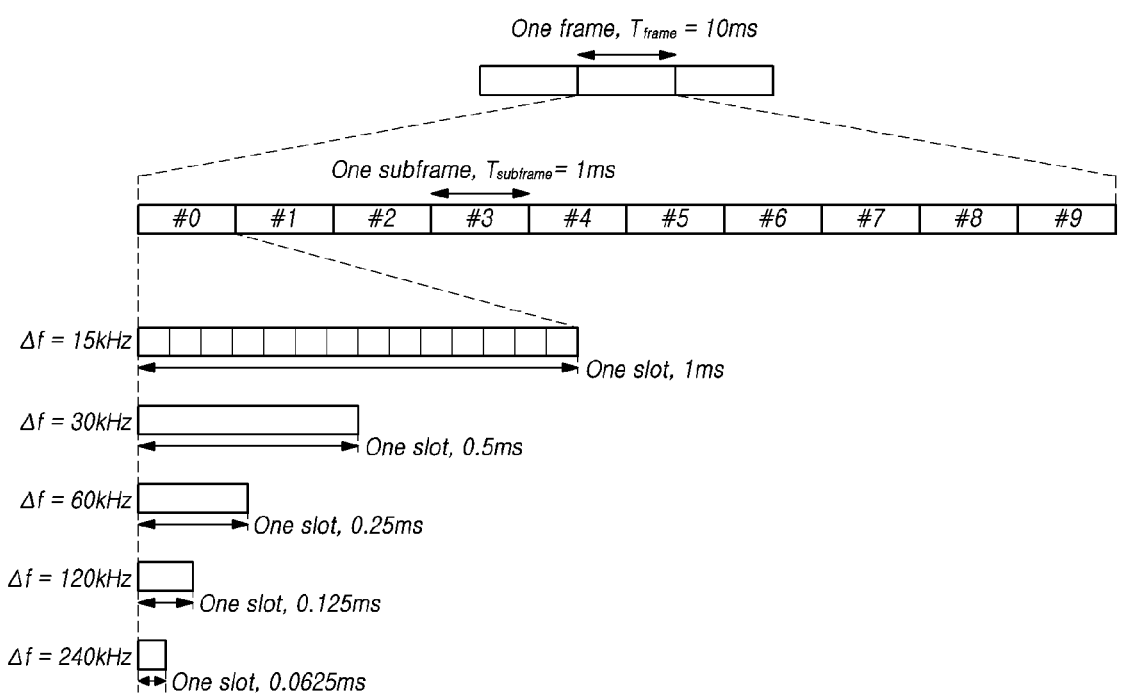
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
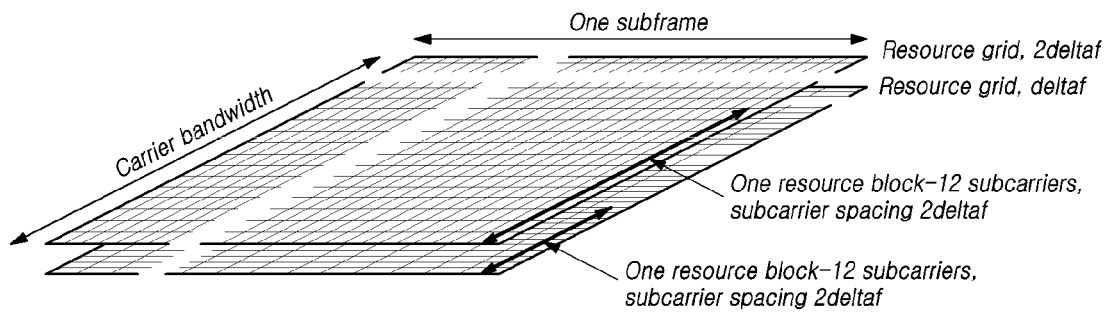
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
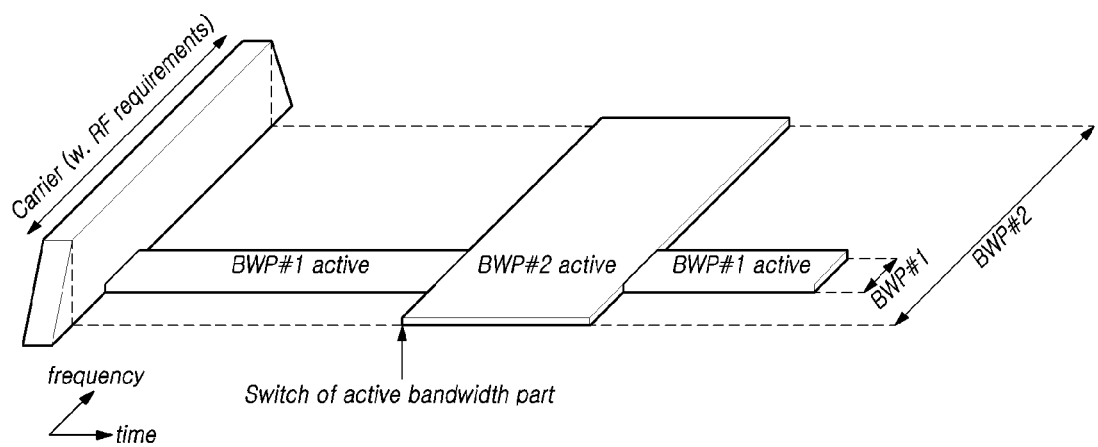
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
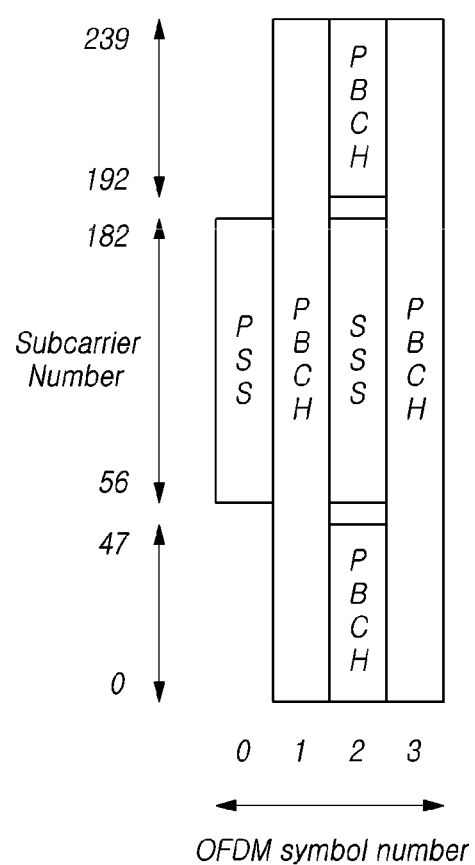
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
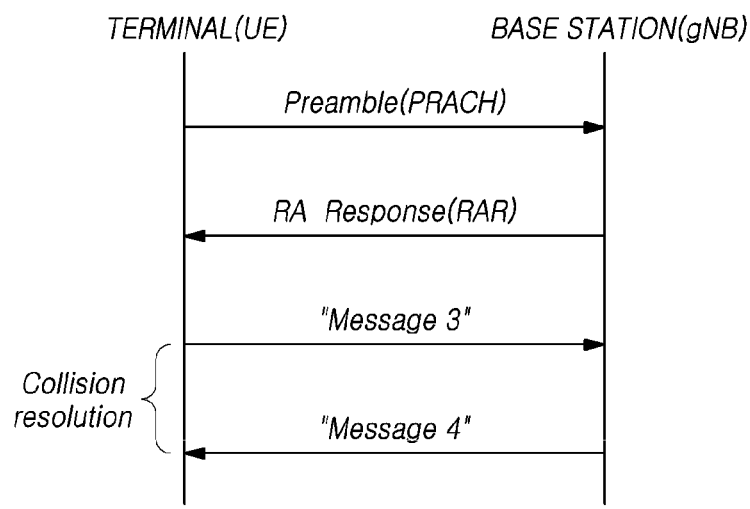
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
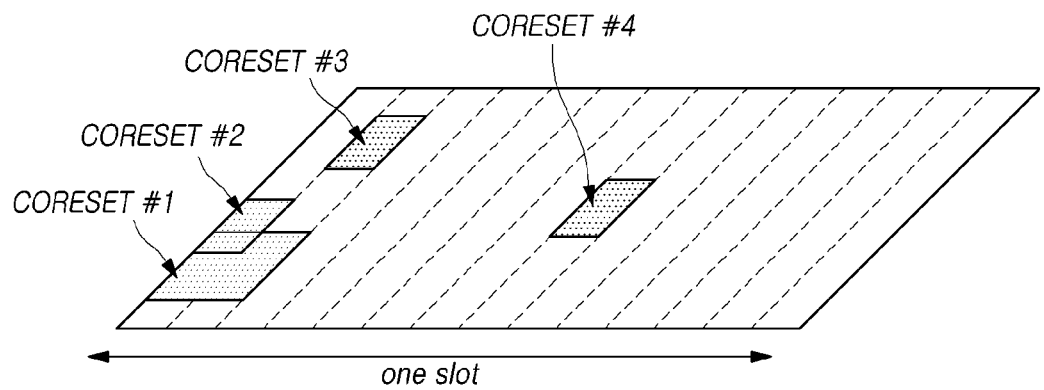
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
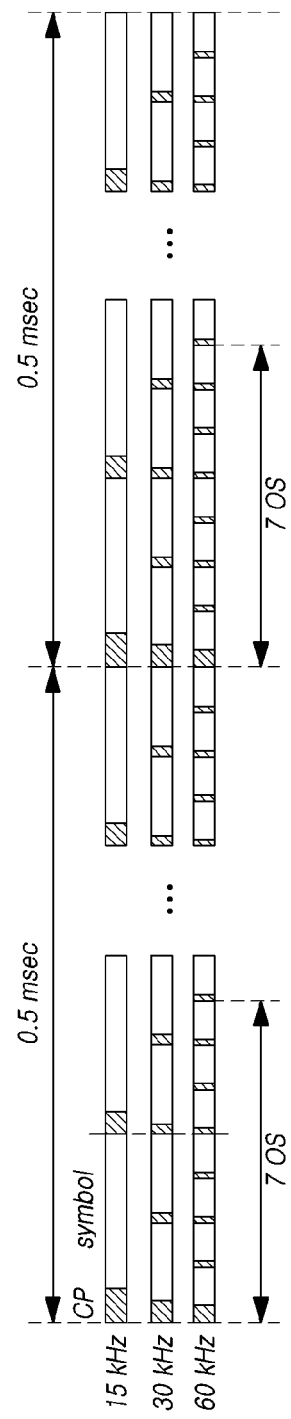
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Wider Bandwidth Operations>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
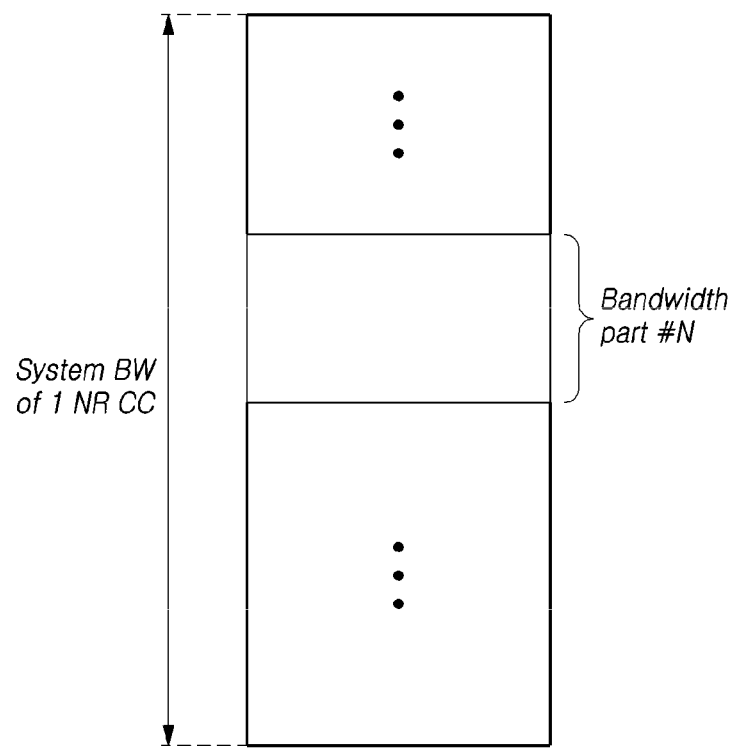
FIG. 9 is a view schematically illustrating a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Hereinafter, a method of a low-performance UE not supporting uplink and downlink simultaneous transmission for transmitting and receiving data in a half-duplex scheme is described with reference to the related drawings.

In the disclosure, a UE operating in a half-duplex scheme may denote a low-performance UE that does not simultaneously support uplink transmission and downlink reception. However, the present embodiments are not limited thereto, and the present embodiments may be applied to UEs operating in a half-duplex scheme among UEs supporting a full duplex scheme. In the disclosure, low-performance UE is an example term and may also be referred to as a low-complexity UE. Further, it is assumed that the UE reports the UE capability related to low performance to the base station, and the UE and the base station perform communication in half-duplex operation.

Figure 10:
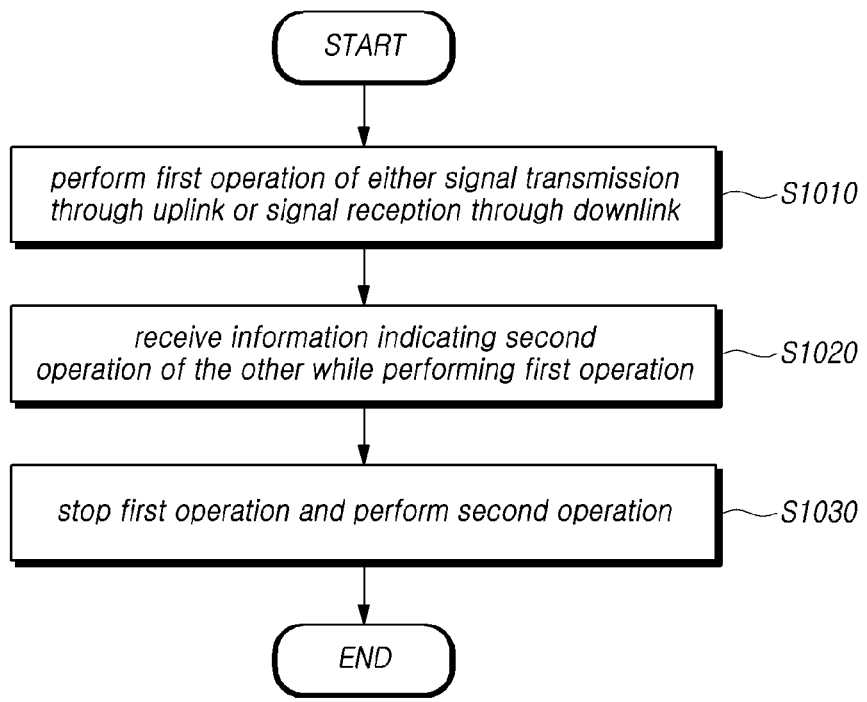
FIG. 10 is a flowchart illustrating a method of a UE operating in HD-FDD for transmitting and receiving a signal according to an embodiment.

FIG. 10 is a flowchart illustrating a method of a UE operating in half duplex (HD)-frequency division duplex (FDD) for transmitting and receiving signals according to an embodiment.

Referring to FIG. 10, the UE may perform, as a first operation, one of transmitting a signal through an uplink and receiving a signal through a downlink in an FDD channel environment (S1010).

In the FDD environment, for a low-performance UE that does not simultaneously support uplink transmission and downlink reception, as a first operation, one of signal transmission through uplink and signal reception through downlink may be configured.

According to an embodiment, the first operation may be one of repeated signal transmission through uplink and repeated signal reception through downlink. In other words, to enhance coverage, the UE may be configured to repeatedly transmit an uplink signal over several time resources or to repeatedly receive a downlink signal.

For example, it is assumed that repeated transmission of an uplink data channel (PUSCH) is configured for the UE. PUSCH repetition types are divided into PUSCH repetition type A and PUSCH repetition type B. The following embodiments will be described primarily based on PUSCH repetition type A, but the embodiments are limited thereto. For example, the embodiments may be applied to PUSCH repetition type B in substantially the same manner.

The UE may be configured to repeatedly transmit the PUSCH for each slot according to the number of repetitions determined by UL grant or RRC signaling in available contiguous slots. However, this is only an example. The first operation is not limited to a specific signal if repeated transmission, such as of PUCCH and PRACH, may be configured.

According to another embodiment, the first operation may be constituted of either signal transmission according to a predetermined period through uplink or signal reception according to a predetermined period through downlink. In other words, the UE may periodically transmit or receive the same signal according to RRC signaling, with a specific logical slot period and a preconfigured frequency resource and MCS index, based on semi-static uplink/downlink scheduling. Even in this case, the first operation is not limited to a specific signal as long as periodic transmission or reception may be configured.

Referring back to FIG. 10, the UE may receive information indicating, as a second operation, the other of the data transmission through uplink and the data reception through downlink while performing the first operation (S1020).

In other words, while the UE performs the above-described first operation, the second operation different from the first operation may be indicated (e.g., instructed) for the time resource allocated to the first operation. Here, the second operation may be an operation with a transmission direction opposite to that of the first operation. In other words, for the UE, if the repeated transmission of an uplink data channel is configured as the first operation, the second operation may be a downlink signal reception operation.

For example, the first operation and the second operation may be the UE's configured grant-based PUSCH or PUCCH transmission or SRS transmission operation and the UE's SSB reception operation. Or, the first operation and second operation may be reception of PDCCH in a UE specific search space (USS), semi persistent scheduling (SPS) PDSCH reception, CSI-RS or downlink PRS reception operation and transmission operation in a valid RACH occasion (RO).

The embodiment was described as receiving information indicating (e.g., instructing) the second operation, but embodiments are not limited thereto. For example, the embodiment may be applied in substantially the same manner even when information indicating (e.g., instructing) the second operation is previously received, and the time resource where the second operation should be performed according to the corresponding information arrives. Further, the embodiment may be likewise applied even where the signal subjected to the second operation is directly transmitted or received without receiving the information indicating the second operation.

Referring back to FIG. 10, the UE stops performing the first operation and may perform the second operation according to reception of information (S1030).

As described above, since the UE operates in a half-duplex scheme, it is impossible to simultaneously perform the second operation while performing the first operation. Accordingly, when the second operation is indicated (e.g., instructed), the UE may stop performing the first operation and perform the second operation in the time resource allocated for the second operation.

According to an embodiment, it is assumed that four repeated transmissions of an uplink signal are configured for the UE, and reception of a downlink signal is indicated in the slot where the third repeated transmission is to be performed. In this case, the UE performs the repeated transmission of an uplink signal only in the positions where the first and second repeated are performed and stop the subsequent repeated transmission.

According to another embodiment, after performing the second operation, the UE may resume the first operation based on the number of times of repeated transmission as set. In the above-described example, the UE may receive the corresponding downlink signal and perform transmission of an uplink signal in the position where the fourth repetition is performed. Or, the UE may perform the first, second, and fourth repeated transmissions to maintain coverage and may perform additional repeated transmission in the position where the fifth repetition may be performed.

Or, as another embodiment, it is assumed that repeated transmission of PUSCH is configured as the first operation for the UE and reception of an SSB is the second operation. In this case, if SSB reception and repeated transmission of PUSCH overlap, the UE may stop repeated transmission of PUSCH. Or, if the symbol where the SSB is received overlaps the symbol where repeated transmission of PUSCH is to be performed overlap, the UE may exclude the slot where the corresponding symbol is included from the slots available for repeated transmission and perform repeated transmission.

Or, according to an embodiment, it is assumed that reception of a downlink signal is indicated (e.g., instructed) when transmission of an uplink signal semi-statically in a predetermined period is configured for the UE. The UE may stop periodic transmission only in the slots requiring reception of the downlink signal and resume transmission in the subsequent slot. In other words, if semi-static transmission and repeated transmission for coverage enhancement collide with each other, the UE may prioritize repeated transmission.

According to another embodiment, the UE may resume the first operation in the earliest time domain resource available after the second operation. In a case where uplink signal transmission semi-statically in a predetermined period is configured, if downlink signal reception is indicated, the UE may transmit an uplink signal through a slot available after the slot which is allocated for reception of the corresponding downlink signal. In other words, the UE may perform periodic uplink signal transmission in the earliest slot where no transmission in the opposite direction is indicated. For example, if periodic uplink signal transmission is configured in every fifth slot, but downlink signal reception is indicated (e.g., instructed) in the fifth and sixth slots, the UE may perform periodic uplink signal transmission through the seventh slot.

According to an embodiment, processing on collision between downlink and uplink according to the above-described HD-FDD operation may be applied after multiplexing and prioritization is configured in the UE. In this case, before the above-described restriction on transmission by the UE is applied, UCI having the same priority index in the PUCCH or PUSCH may be multiplexed. In this case, the PUCCH or PUSCH may have the same priority index as the priority index of the UCI that the UE multiplexes in the PUCCH or PUSCH.

According to the embodiments above, the low-performance UE not supporting uplink/downlink simultaneous transmission may seamlessly perform duplexing in an FDD channel environment. In particular, it is possible to mitigate configuration restrictions, such as on repeated transmission or semi-static transmission, to thereby provide a more flexible configuration according to the channel and service environment.

Figure 11:
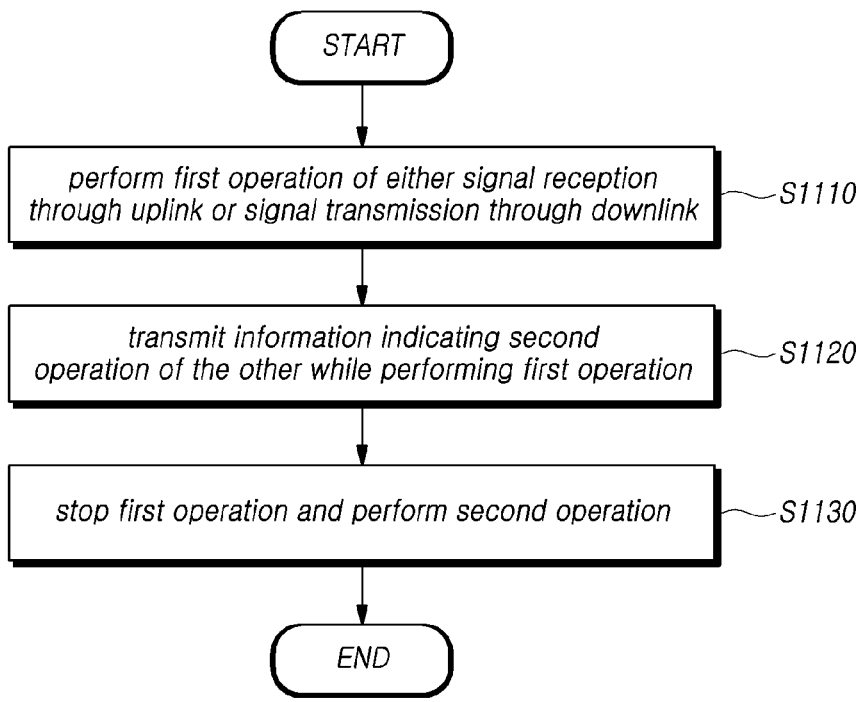
FIG. 11 is a flowchart illustrating a method of a base station for transmitting and receiving signals with a UE operating in HD-FDD according to an embodiment.

FIG. 11 is a flowchart illustrating a method of a base station for transmitting/receiving data with a UE operating in HD-FDD according to an embodiment.

Referring to FIG. 11, a base station may perform, as a first operation, one of data reception through uplink and data transmission through downlink in an FDD channel environment (S1110).

In the FDD environment, for a low-performance UE that does not simultaneously support uplink transmission and downlink reception, the base station may configure, as a first operation, one of signal reception through uplink and signal transmission through downlink.

According to an embodiment, the first operation may be one of repeated signal reception through uplink and repeated signal transmission through downlink. In other words, to enhance coverage, the base station may be configured to repeatedly receive an uplink signal over several time resources or to repeatedly transmit a downlink signal.

For example, it is assumed that repeated reception of an uplink data channel (PUSCH) is configured for the base station. The base station may be configured to repeatedly receive the PUSCH for each slot according to the number of repetitions determined by UL grant or RRC signaling in available contiguous slots. However, this is only an example, and the first operation is not limited to a specific signal if repeated reception, such as of PUCCH and PRACH, may be configured.

According to another embodiment, the first operation may be one of signal reception according to a predetermined period through uplink and signal transmission according to a predetermined period through downlink. In other words, the base station may periodically transmit or receive the same signal according to RRC signaling, with a specific logical slot period and a preconfigured frequency resource and MCS index, based on semi-static uplink/downlink scheduling. Even in this case, the first operation is not limited to a specific signal as long as periodic transmission or reception may be configured.

Referring back to FIG. 11, the base station may transmit information indicating (e.g., instructing), as a second operation, the other of the data transmission through uplink and the data reception through downlink while performing the first operation (S1120).

In other words, while the base station performs the above-described first operation, the second operation different from the first operation may be indicated (e.g., instructed) for the time resource allocated to the first operation. Here, the second operation may be an operation with a transmission direction opposite to that of the first operation. In other words, for the base station, if the repeated reception of an uplink data channel is configured as the first operation, the second operation may be a downlink signal transmission operation.

For example, the first operation and the second operation may be the base station's configured grant-based PUSCH or PUCCH reception or SRS reception operation and the UE's SSB transmission operation. Or, the first operation and second operation may be transmission of PDCCH in a UE specific search space (USS), semi persistent scheduling (SPS) PDSCH transmission, CSI-RS or downlink PRS transmission operation and reception operation in a valid RACH occasion (RO).

The embodiment was described as transmitting information indicating (e.g., instructing) the second operation, but embodiments are not limited thereto. For example, the embodiment may be applied in substantially the same manner even when information indicating the second operation is previously transmitted, and the time resource where the second operation should be performed according to the corresponding information arrives. Further, the embodiment may be likewise applied even where the signal subjected to the second operation is directly transmitted or received without transmitting the information indicating the second operation.

Referring back to FIG. 11, the base station stops performing the first operation and may perform the second operation according to transmission of information (S1130).

As described above, since the UE operates in a half-duplex scheme, the base station cannot simultaneously perform the second operation while performing the first operation with the corresponding UE. Accordingly, when the second operation is indicated (e.g., instructed), the base station may stop performing the first operation and perform the second operation in the time resource allocated for the second operation.

According to an embodiment, it is assumed that four repeated receptions of an uplink signal are configured for the base station, and transmission of a downlink signal is indicated (e.g., instructed) in the slot where the third repeated reception is to be performed. In this case, the base station performs the repeated reception of an uplink signal only in the positions where the first and second repeated are performed and stop the subsequent repeated reception.

According to another embodiment, after performing the second operation, the base station may resume the first operation based on the number of times of repeated reception as set. In the above-described embodiment, the base station may transmit the corresponding downlink signal and perform reception of an uplink signal in the position where the fourth repetition is performed. Or, the base station may perform the first, second, and fourth repeated transmissions to maintain coverage and may perform additional repeated reception in the position where the fifth repetition may be performed.

Or, as another embodiment, it is assumed that repeated reception of PUSCH is configured as the first operation for the base station and transmission of an SSB is the second operation. In this case, if SSB transmission and repeated reception of PUSCH overlap, the base station may stop repeated reception of PUSCH. Or, if the symbol where the SSB is transmitted overlaps the symbol where repeated reception of PUSCH is to be performed overlap, the base station may exclude the slot where the corresponding symbol is included from the slots available for repeated reception and perform repeated reception.

Or, according to an embodiment, it is assumed that transmission of a downlink signal is configured when reception of an uplink signal semi-statically in a predetermined period is configured for the base station. The base station may stop periodic transmission only in the slots requiring transmission of the downlink signal and resume reception in the subsequent slot. In other words, if semi-static transmission and repeated reception for coverage enhancement collide with each other, the base station may prioritize repeated reception.

According to another embodiment, the base station may resume the first operation in the earliest time domain resource available after the second operation. In a case where uplink signal reception semi-statically in a predetermined period is configured, if downlink signal transmission is indicated (e.g., instructed), the base station may receive an uplink signal through a slot available after the slot which is allocated for transmission of the corresponding downlink signal. In other words, the base station may perform periodic uplink signal reception in the earliest slot where no transmission in the opposite direction is indicated. For example, if periodic uplink signal reception is configured in every fifth slot, but downlink signal transmission is indicated in the fifth and sixth slots, the base station may perform periodic uplink signal reception through the seventh slot.

According to the embodiment, the low-performance UE not supporting uplink/downlink simultaneous transmission may seamlessly perform duplexing in an FDD channel environment. In particular, it is possible to mitigate configuration restrictions, such as on repeated transmission or semi-static transmission, to thereby provide a more flexible configuration according to the channel and service environment.

Hereinafter, each embodiment related to data transmission/reception in a half-duplex scheme in NR will be described in detail with reference to related drawings. The disclosure provides a duplexing method for UEs that do not support uplink/downlink simultaneous transmission in the 3GPP NR system.

NR required high mandatory UE performance. This is primarily specified with a maximum bandwidth of 100 MHz, a large number of antennas, and high processing rate and, as compared with the conventional LTE UE, and the NR UE is required to come equipped with high-performance hardware as default. Accordingly, to increase the UE spectrum, Rel-17 proceeds with study and a work item of support of reduced capability NR devices (NR-REDCAP). The corresponding item is approached mainly from the three perspectives as follows.

Reduced maximum UE bandwidth: Supports low operating bandwidth (20 MHz or less)

Reduced minimum number of Rx branches: Supports a reduced number of antennas

Maximum number of DL MIMO layers: Supports low MIMO layer (1, 2 layer)

Relaxed maximum modulation order: Supports low modulation scheme

Duplex operation: Supports low duplexing mode (Half-Duplex FDD)

Among them, there are discussions for supporting UEs incapable of simultaneously performing transmission and reception in the FDD environment, i.e., HD-FDD mode.

Separately therefrom, schemes for enhancing coverage to compensate for coverage loss due to reduced resources in NR-REDCAP have been proposed. However, the NR-coverage enhancement (NR-CE) study/work item, which is already in progress in Rel. 17 conducts a similar approach, so that the corresponding scheme is highly likely to be handled in NR-CE.

In this regard, NR-CE mainly discusses methods for repeatedly transmitting signals to enhance coverage, focusing particularly on schemes for coverage enhancement for the PUSCH, PUCCH, and some PRACHs of the uplink channel which are regarded as having a relatively short arrival range in conventional NR.

Meanwhile, the typical NR provides a semi-static uplink/downlink scheduling method, and this is achieved by previous configuration via RRC, with a specific logical slot period and a preconfigured frequency resource and MCS index.

The typical TDD mode is an environment where no uplink/downlink simultaneous transmission occurs and addresses a disparity in time between uplink and downlink by mapping different signals, connected in a specific positional relationship, to a transmission space represented as a logical channel. However, the FDD environment should be operated in such a manner that logical channels are arranged in all time resources, and uplink/downlink transmission collision is prevented by allowing the base station to properly schedule not to cause the uplink/downlink transmissions to overlap each other.

However, if some signals are configured to perform repeated transmission or a transmission resource is configured semi-statically within a specific period for a service that needs to meet some latency characteristics, it may be impossible for the scheduler to completely separate uplink/downlink. For example, it is assumed that, for low-latency low-speed service, e.g., VoNR, the PDSCH is semi-statically allocated with an interval not more than 5 slots but, for uplink coverage enhancement, repeated transmission is performed on the uplink data channel five or more times. In this case, by the nature of the FDD environment where a logical channel is defined always as contiguous slots, it is impossible to operate the scheduler in such a manner that uplink/downlink do not always overlap each other.

The disclosure provides a method of the low-performance UE not supporting uplink/downlink simultaneous transmission for performing duplexing in an FDD channel environment. In particular, the disclosure provides a method for addressing uplink/downlink transmission collision in a context where repeated transmission or semi-static transmission is configured and a method for avoiding and processing a collision when the collision occurs.

The disclosure also provides a repeated transmission configuration method for preventing uplink/downlink collision and a semi-static transmission configuration method for preventing uplink/downlink collision.

Embodiment 1: Method for Configuring Repeated Transmission to Prevent Uplink/Downlink Collision This embodiment is an operation method when an uplink/downlink transmission switch occurs in an environment configured to perform repeated transmission over several time resources without feedback of the same or equivalent signal for the reason, e.g., coverage enhancement. In this case, the UE may be aware of whether the base station previously indicates (e.g., instructs) to perform transmission in a specific slot and, if such indication is present, the UE may disable repeated transmission in the corresponding slot. This may be broken down largely into a method for stopping only transmission in the corresponding slot and a method for stopping all transmissions after the corresponding slot.

① Method for Stopping Only Transmission in the Corresponding Slot

According to an embodiment, when transmission in the direction opposite to the current transmission direction is indicated (e.g., instructed), the UE may stop repeated transmission only in the slot requiring the corresponding transmission and, in a subsequent slot, resume repeated transmission. For example, it is assumed that four uplink repeated transmissions are configured for the UE, and downlink transmission is indicated in the slot where the third repeated transmission is to be performed. In this case, the UE may perform uplink transmission only in the positions where the first, second, and fourth repetition is performed. Or, the UE may perform the first, second, and fourth repeated transmissions to maintain coverage and may perform additional repeated transmission in the position where the fifth repetition may be performed.

② Method for Stopping all Transmissions after the Corresponding Slot

According to an embodiment, when transmission in the direction opposite to the current transmission direction is indicated (e.g., instructed), the UE may stop all repeated transmissions after the slot requiring the corresponding transmission. For example, it is assumed that four uplink repeated transmissions are configured for the UE, and downlink transmission is indicated (e.g., instructed) in the slot where the third repeated transmission is to be performed. In this case, the UE performs the repeated transmission of an uplink signal only in the positions where the first and second repeated are performed and stop the subsequent repeated transmission.

③ Method for Adjusting Feedback Time

When repeated transmission is configured, the feedback for the corresponding repeated transmission is previously configured to be transmitted in a specific position, a specific time after the last transmission is ended, in general. When the last transmission time of repeated transmission is changed by the above-described methods ① and ②, the UE may transmit feedback depending on the originally set last transmission time. Alternatively, the UE may transmit feedback depending on the transmission time at which the last repeated transmission is actually performed.

Embodiment 2: Method for Configuring Semi-Static Transmission to Prevent Uplink/Downlink Collision This embodiment is an operation method when an uplink/downlink transmission switch occurs in an environment where semi-static uplink or downlink in a predetermined period is configured for the reason, e.g., maintaining latency quality. This embodiment includes a method for stopping only transmission in the corresponding slot and a method for delaying transmission to an available slot after the corresponding slot.

① Method for Stopping Only Transmission in the Corresponding Slot

According to an embodiment, when transmission in the direction opposite to the current transmission direction is indicated (e.g., instructed), the UE may stop semi-static transmission only in the slot requiring the corresponding transmission and, in a subsequent slot, resume transmission. In other words, if semi-static transmission and repeated transmission for coverage enhancement collide with each other, the UE may prioritize repeated transmission.

② Method for Delaying Transmission to a Slot Available after the Corresponding Slot According to an embodiment, when transmission in the direction opposite to the current transmission direction is indicated (e.g., instructed), the UE may perform the current transmission in a slot available for transmission after the slot requiring the corresponding transmission, i.e., an earliest slot where transmission in the opposite direction is not indicated (e.g., instructed). For example, if semi-static transmission is configured in every fifth slot, but transmission in the opposite direction is indicated in the fifth and sixth slots, the seventh slot may be configured as a semi-static transmission space.

③ Method for Adjusting Feedback Time

As in the above-described embodiment 1, if a change is made to whether transmission is performed and transmission time by methods ① and ②, the UE may transmit feedback depending on whether transmission is performed. Alternatively, the UE may transmit feedback depending on the last transmission time. In other words, when transmission is stopped due to method ①, the UE may not transmit feedback. If the actual transmission time is changed by ②, the UE may transmit feedback in the position determined depending on the changed time.

The embodiments of the disclosure may be applied independently or in any type of combination. Further, among the terms used herein, novel terms are ones arbitrarily chosen for ease of understanding, and the content of the disclosure is applicable even where other terms with the same meaning are used.

Accordingly, the low-performance UE not supporting uplink/downlink simultaneous transmission may seamlessly perform duplexing in an FDD channel environment. In particular, it is possible to mitigate configuration restrictions, such as on repeated transmission or semi-static transmission, to thereby provide a more flexible configuration according to the channel and service environment.

The disclosure may also provide a UE's transmission method for coverage extension in the NR system and a base station's transmission method for supporting coverage extension-supporting UEs. The above-described embodiments may also apply even where transmission in a different transmission direction is indicated while repeated transmission is performed.

Embodiment 3: Transmission Method of Coverage Extension-Supporting UE

This embodiment is a method for enabling successful control/data message transmission when the coverage extension-supporting UE is out of coverage. This is composed of repeated transmission of the same or equivalent signal, and the corresponding repetition pattern should be previously agreed on. In this regard, the embodiment includes a method of repeated transmission in a different resource on the time axis and a method of repeated transmission in a different resource on the frequency axis.

① Method of Repeated Transmission in a Different Resource on the Time Axis

This method enables the coverage extension-supporting UE to re-transmit the same or equivalent signal in a next slot or a slot away by a preset interval upon performing all transmissions. To that end, the base station may determine the number of repetitions or slot interval depending on the PRACH preamble, or preset it through, e.g., RRC, or designate the number of repetitions in each scheduling DCI. If set in the DCI, this may be set with a separate field or may be included as a parameter in a time domain resource allocation (TDRA) table defined for the corresponding UE. The DCI may be scrambled to the RNTI which is newly adopted to allow only the coverage extension user to receive it.

② Method of Repeated Transmission in a Different Resource on the Frequency Axis

This method is for enabling the coverage extension-supporting UE to transmit the same or equivalent signal in different bands in performing all transmissions. To that end, the base station may determine the number of repetitions depending on the PRACH preamble, set it through, e.g., RRC, or set it in each DCI. Further, the frequency band allocated upon DCI scheduling may be allocated considering both the two transmissions. In other words, the UE may divide the allocated resources by a predetermined rule and transmit the same or equivalent signal in each resource. The DCI may likewise be scrambled to the RNTI which is newly adopted to allow only the coverage extension user to receive it.

Embodiment 4: Transmission Method of Base Station for Coverage Extension-Supporting UE This embodiment is a method for enabling successful control/data message reception when the coverage extension-supporting UE is out of coverage. Like UE transmission, this method is also composed of repeated transmission of the same or equivalent signal, and the corresponding repetition pattern should be previously agreed on. The embodiment includes a method of repeated transmission in a different resource on the time axis and a method of repeated transmission in a different resource on the frequency axis. As specific methods, the same type of methods as ① and ② of the above-described embodiment 2 may be used.

Hereinafter, hardware and software configurations of a receiving UE and a transmitting UE which may perform all or some of the embodiments described above in connection with FIGS. 1 to 11 will be described below with reference to the drawings.

Figure 12:
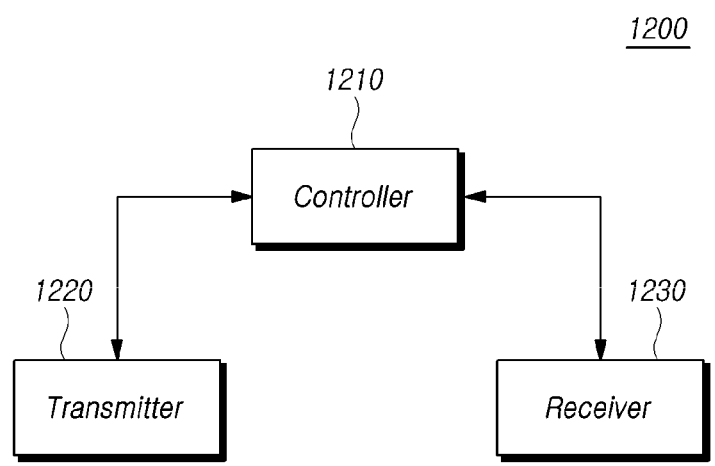
FIG. 12 is a block diagram illustrating a UE according to an embodiment.

FIG. 12 is a block diagram illustrating a UE 1200 according to an embodiment.

Referring to FIG. 12, a UE 1200 includes a controller 1210, a transmitter 1220, and a receiver 1230.

The controller 1210 controls the overall operation of the UE 1200 to perform the method of a UE operating in HD-FDD for transmitting and receiving signals according to an embodiment. The transmitter 1220 transmits uplink control information and data or messages to the base station via a corresponding channel according to the control of the controller 1210. The receiver 1230 receives downlink control information and data or messages from the base station via a corresponding channel according to the control of the controller 1210.

The controller 1210 may perform, as a first operation, one of transmitting a signal through an uplink and receiving a signal through a downlink in an FDD channel environment.

According to an embodiment, the first operation may be one of repeated signal transmission through uplink and repeated signal reception through downlink. In other words, to enhance coverage, the controller 1210 may be configured to repeatedly transmit an uplink signal over several time resources or to repeatedly receive a downlink signal.

For example, it is assumed that repeated transmission of an uplink data channel (PUSCH) is configured for the UE. The controller 1210 may be configured to repeatedly transmit the PUSCH for each slot according to the number of repetitions determined by UL grant or RRC signaling in available contiguous slots. However, this is only an example, and the first operation is not limited to a specific signal if repeated transmission, such as of PUCCH and PRACH, may be configured.

According to another embodiment, the first operation may be one of signal transmission according to a predetermined period through uplink and signal reception according to a predetermined period through downlink. In other words, the controller 1210 may periodically transmit or receive the same signal according to RRC signaling, with a specific logical slot period and a preconfigured frequency resource and MCS index, based on semi-static uplink/downlink scheduling. Even in this case, the first operation is not limited to a specific signal as long as periodic transmission or reception may be configured.

The controller 1210 may receive information indicating (e.g., instructing), as a second operation, the other of the data transmission through uplink and the data reception through downlink while performing the first operation. In other words, while the UE performs the above-described first operation, the second operation whose transmission direction is opposite may be indicated (e.g., instructed) for the time resource allocated to the first operation.

For example, the first operation and the second operation may be the UE's configured grant-based PUSCH or PUCCH transmission or SRS transmission operation and the UE's SSB reception operation. Or, the first operation and second operation may be reception of PDCCH in a UE specific search space (USS), semi persistent scheduling (SPS)

PDSCH reception, CSI-RS or downlink PRS reception operation and transmission operation in a valid RACH occasion (RO).

The controller 1210 may stop performing the first operation and may perform the second operation according to reception of information. As described above, since the UE operates in a half-duplex scheme, it is impossible to simultaneously perform the second operation while performing the first operation. Accordingly, when the second operation is indicated (e.g., instructed), the UE may stop performing the first operation and perform the second operation in the time resource allocated for the second operation.

According to an embodiment, it is assumed that four repeated transmissions of an uplink signal are configured for the UE, and reception of a downlink signal is indicated in the slot where the third repeated transmission is to be performed. In this case, the controller 1210 performs the repeated transmission of an uplink signal only in the positions where the first and second repeated are performed and stop the subsequent repeated transmission.

According to another embodiment, after performing the second operation, the controller 1210 may resume the first operation based on the number of times of repeated transmission as set. In the above-described example, the controller 1210 may receive the corresponding downlink signal and perform transmission of an uplink signal in the position where the fourth repetition is performed. Or, the controller 1210 may perform the first, second, and fourth repeated transmissions to maintain coverage and may perform additional repeated transmission in the position where the fifth repetition may be performed.

Or, as another embodiment, it is assumed that repeated transmission of PUSCH is configured as the first operation for the UE and reception of an SSB is the second operation. In this case, if SSB reception and repeated transmission of PUSCH overlap, the controller 1210 may stop repeated transmission of PUSCH. Or, if the symbol where the SSB is received overlaps the symbol where repeated transmission of PUSCH is to be performed overlap, the controller 1210 may exclude the slot where the corresponding symbol is included from the slots available for repeated transmission and perform repeated transmission.

Or, according to an embodiment, it is assumed that reception of a downlink signal is indicated (e.g., instructed) when transmission of an uplink signal semi-statically in a predetermined period is configured for the UE. The controller 1210 may stop periodic transmission only in the slots requiring transmission of the downlink signal and resume transmission in the subsequent slot. In other words, if semi-static transmission and repeated transmission for coverage enhancement collide with each other, the controller 1210 may prioritize repeated transmission.

According to another embodiment, the controller 1210 may resume the first operation in the earliest time domain resource available after the second operation. In a case where uplink signal transmission semi-statically in a predetermined period is configured, if downlink signal reception is indicated, the controller 1210 may transmit an uplink signal through a slot available after the slot which is allocated for reception of the corresponding downlink signal. In other words, the controller 1210 may perform periodic uplink signal transmission in the earliest slot where no transmission in the opposite direction is indicated. For example, if periodic uplink signal transmission is configured in every fifth slot, but downlink signal reception is indicated in the fifth and sixth slots, the controller 1210 may perform periodic uplink signal transmission through the seventh slot.

According to the embodiment, the low-performance UE not supporting uplink/downlink simultaneous transmission may seamlessly perform duplexing in an FDD channel environment. In particular, it is possible to mitigate configuration restrictions, such as on repeated transmission or semi-static transmission, to thereby provide a more flexible configuration according to the channel and service environment.

Figure 13:
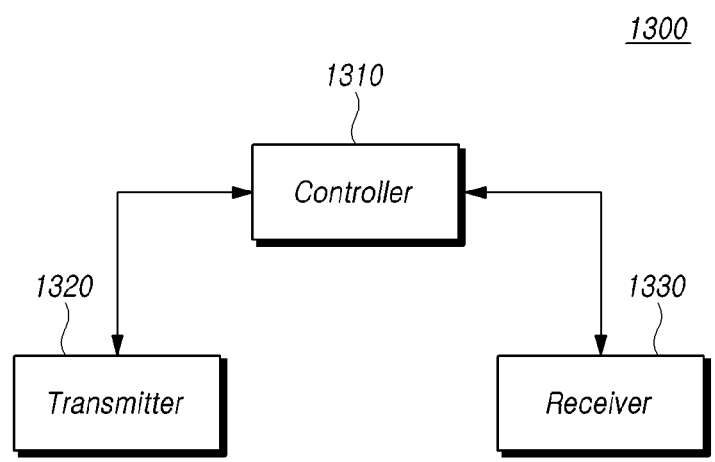
FIG. 13 is a block diagram illustrating a base station according to an embodiment.

FIG. 13 is a block diagram illustrating a base station 1300 according to an embodiment.

Referring to FIG. 13, a base station 1300 includes a controller 1310, a transmitter 1320, and a receiver 1330.

The controller 1310 controls the overall operation of the base station 1300 for performing the method of a UE operating in HD-FDD for transmitting and receiving signals according to an embodiment. The transmitter 1320 and the receiver 1330 are used to transmit or receive signals or messages or data necessary for performing the above-described disclosure, with the UE according to the control of the controller 1310.

The controller 1310 may perform, as a first operation, one of data reception through uplink and data transmission through downlink in an FDD channel environment.

According to an embodiment, the first operation may be one of repeated signal reception through uplink and repeated signal transmission through downlink. In other words, to enhance coverage, the controller 1310 may be configured to repeatedly receive an uplink signal over several time resources or to repeatedly transmit a downlink signal.

For example, it is assumed that repeated reception of an uplink data channel (PUSCH) is configured for the base station. The controller 1310 may be configured to repeatedly receive the PUSCH for each slot according to the number of repetitions determined by UL grant or RRC signaling in available contiguous slots. However, this is only an example, and the first operation is not limited to a specific signal if repeated reception, such as of PUCCH and PRACH, may be configured.

According to another embodiment, the first operation may be one of signal reception according to a predetermined period through uplink and signal transmission according to a predetermined period through downlink. In other words, the controller 1310 may periodically transmit or receive the same signal according to RRC signaling, with a specific logical slot period and a preconfigured frequency resource and MCS index, based on semi-static uplink/downlink scheduling. Even in this case, the first operation is not limited to a specific signal as long as periodic transmission or reception may be configured.

The controller 1310 may transmit information indicating (e.g., instructing), as a second operation, the other of the data transmission through uplink and the data reception through downlink while performing the first operation.

In other words, while performing the above-described first operation, the controller 1310 may indicate the different second operation for the time resource allocated to the first operation. Here, the second operation may be an operation with a transmission direction opposite to that of the first operation. In other words, for the base station, if the repeated reception of an uplink data channel is configured as the first operation, the second operation may be a downlink signal transmission operation.

For example, the first operation and the second operation may be the base station's configured grant-based PUSCH or PUCCH reception or SRS reception operation and the UE's SSB transmission operation. Or, the first operation and second operation may be transmission of PDCCH in a UE specific search space (USS), semi persistent scheduling (SPS) PDSCH transmission, CSI-RS or downlink PRS transmission operation and reception operation in a valid RACH occasion (RO).

The controller 1310 may stop performing the first operation and may perform the second operation according to transmission of information. As described above, since the UE in the disclosure is a UE operating in a half-duplex scheme, the controller 1310 cannot simultaneously perform the second operation while performing the first operation with the corresponding UE. Accordingly, when the second operation is indicated (e.g., instructed), the controller 1310 may stop performing the first operation and perform the second operation in the time resource allocated for the second operation.

According to an embodiment, it is assumed that four repeated receptions of an uplink signal are configured for the base station, and transmission of a downlink signal is indicated in the slot where the third repeated reception is to be performed. In this case, the controller 1310 performs the repeated reception of an uplink signal only in the positions where the first and second repeated are performed and stop the subsequent repeated reception.

According to another embodiment, after performing the second operation, the controller 1310 may resume the first operation based on the number of times of repeated reception as set. In the above-described example, the controller 1310 may transmit the corresponding downlink signal and perform reception of an uplink signal in the position where the fourth repetition is performed. Or, the controller 1310 may perform the first, second, and fourth repeated transmissions to maintain coverage and may perform additional repeated reception in the position where the fifth repetition may be performed.

Or, as another example, it is assumed that repeated reception of PUSCH is configured as the first operation for the base station and transmission of an SSB is the second operation. In this case, if SSB transmission and repeated reception of PUSCH overlap, the controller 1310 may stop repeated reception of PUSCH. Or, if the symbol where the SSB is transmitted overlaps the symbol where repeated reception of PUSCH is to be performed overlap, the controller 1310 may exclude the slot where the corresponding symbol is included from the slots available for repeated reception and perform repeated reception.

Or, according to an embodiment, it is assumed that transmission of a downlink signal is configured when reception of an uplink signal semi-statically in a predetermined period is configured for the base station. The controller 1310 may stop periodic transmission only in the slots requiring transmission of the downlink signal and resume reception in the subsequent slot. In other words, if semi-static transmission and repeated reception for coverage enhancement collide with each other, the controller 1310 may prioritize repeated reception.

According to another embodiment, the controller 1310 may resume the first operation in the earliest time domain resource available after the second operation. In a case where uplink signal reception semi-statically in a predetermined period is configured, if downlink signal transmission is indicated, the controller 1310 may receive an uplink signal through a slot available after the slot which is allocated for transmission of the corresponding downlink signal. In other words, the controller 1310 may perform periodic uplink signal reception in the earliest slot where no transmission in the opposite direction is indicated. For example, if periodic uplink signal reception is configured in every fifth slot, but downlink signal transmission is indicated in the fifth and sixth slots, the controller 1310 may perform periodic uplink signal reception through the seventh slot.

According to the embodiment, the low-performance UE not supporting uplink/downlink simultaneous transmission may seamlessly perform duplexing in an FDD channel environment. In particular, it is possible to mitigate configuration restrictions, such as on repeated transmission or semi-static transmission, to thereby provide a more flexible configuration according to the channel and service environment.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for transmitting/receiving a signal by a user equipment (UE) operating in half duplex (HD)-frequency division duplex (FDD), the method comprising:
    performing, as a first half-duplex operation, one of signal transmission through an uplink and signal reception through a downlink in an FDD channel environment;
    receiving information indicating, as a second half-duplex operation, the other of the signal transmission through the uplink and the signal reception through the downlink while performing the first half-duplex operation; and
    stopping the first half-duplex operation and performing the second half-duplex operation according to the reception of the information,
    wherein the first half-duplex operation includes one of repeated transmission of the signal through the uplink and repeated reception of the signal through the downlink, and
    wherein the method further comprising resuming the first half-duplex operation based on a set number of repeated transmissions after performing the second half-duplex operation, wherein the resuming comprises configuring the first half-duplex operation to be repeated in a predetermined number of total slots, performing the first half-duplex operation in one or more corresponding first slots until performing the second half-duplex in one or more corresponding second slots, and resuming the first half-duplex operation in slots following the one or more second slots until reaching the total number of slots.

2. A method for transmitting/receiving, by a base station, a signal to/from a user equipment (UE) operating in half duplex (HD)-frequency division duplex (FDD), the method comprising:
    performing, as a first half-duplex operation, one of signal reception through an uplink and signal transmission through a downlink in an FDD channel environment;
    transmitting information indicating, as a second half-duplex operation, the other of the signal transmission through the uplink and the signal reception through the downlink while performing the first half-duplex operation; and
    stopping the first half-duplex operation and performing the second half-duplex operation according to the transmission of the information,
    wherein the first half-duplex operation includes one of repeated reception of the signal through the uplink and repeated transmission of the signal through the downlink, and
    wherein the method further comprises resuming the first half-duplex operation based on a set number of repeated transmissions after performing the second half-duplex operation, wherein the resuming comprises configuring the first half-duplex operation to be repeated in a predetermined number of total slots, performing the first half-duplex operation in one or more corresponding first slots until performing the second half-duplex in one or more corresponding second slots, and resuming the first half-duplex operation in slots following the one or more second slots until reaching the total number of slots.

3. A user equipment (UE) operating in half duplex (HD)-frequency division duplex (FDD) to transmit/receive a signal, the UE comprising:
    a transmitter;
    a receiver; and
    a controller configured to control the transmitter and the receiver, performing, as a first half-duplex operation, one of signal transmission through an uplink and signal reception through a downlink in an FDD channel environment, receiving information indicating, as a second half-duplex operation, the other of the signal transmission through the uplink and the signal reception through the downlink while performing the first half-duplex operation, and stopping the first half-duplex operation and performing the second half-duplex operation according to the reception of the information,
    wherein the first half-duplex operation includes one of repeated transmission of the signal through the uplink and repeated reception of the signal through the downlink, and
    wherein the controller resumes the first half-duplex operation based on a set number of repeated transmissions after performing the second half-duplex operation, wherein the controller resumes the first half-duplex operation by configuring the first half-duplex operation to be repeated in a predetermined number of total slots, performing the first half-duplex operation in one or more corresponding first slots until performing the second half-duplex in one or more corresponding second slots, and resuming the first half-duplex operation in slots following the one or more second slots until reaching the total number of slots.

* * * * *